Dec. 13, 1960   A. E. PAGE ET AL   2,963,887
STITCH LENGTH CONTROL MECHANISM FOR KNITTING MACHINE
Filed July 19, 1956   10 Sheets-Sheet 1

FIG. I.

INVENTORS
ALBERT E. PAGE &
HORACE LESLIE CURTIS
BY
ATTORNEYS

INVENTORS
ALBERT E. PAGE &
HORACE LESLIE CURTIS
BY
ATTORNEYS

INVENTORS
ALBERT E. PAGE &
HORACE LESLIE CURTIS

ATTORNEYS

INVENTORS
ALBERT E. PAGE &
HORACE LESLIE CURTIS
ATTORNEYS

Dec. 13, 1960    A. E. PAGE ET AL    2,963,887
STITCH LENGTH CONTROL MECHANISM FOR KNITTING MACHINE
Filed July 19, 1956    10 Sheets-Sheet 8
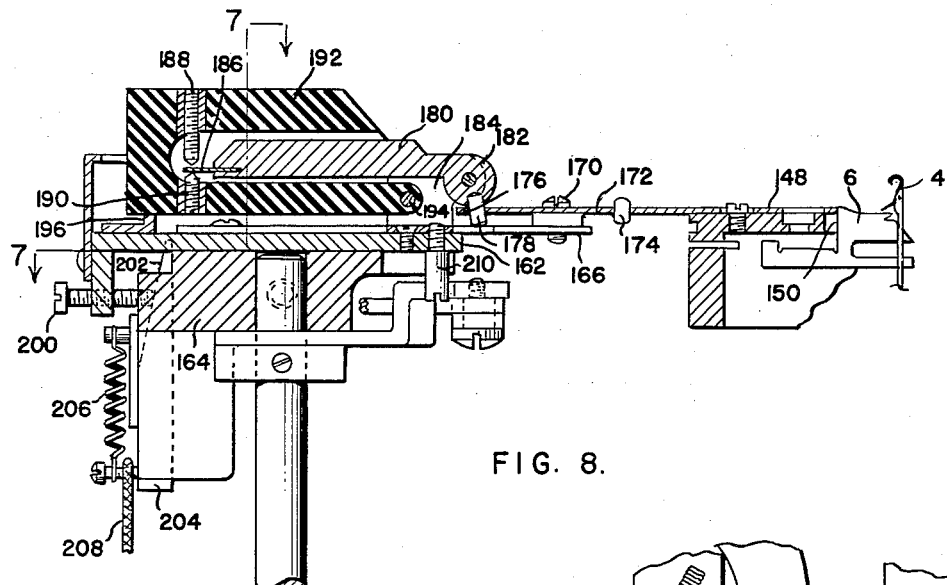
FIG. 8.
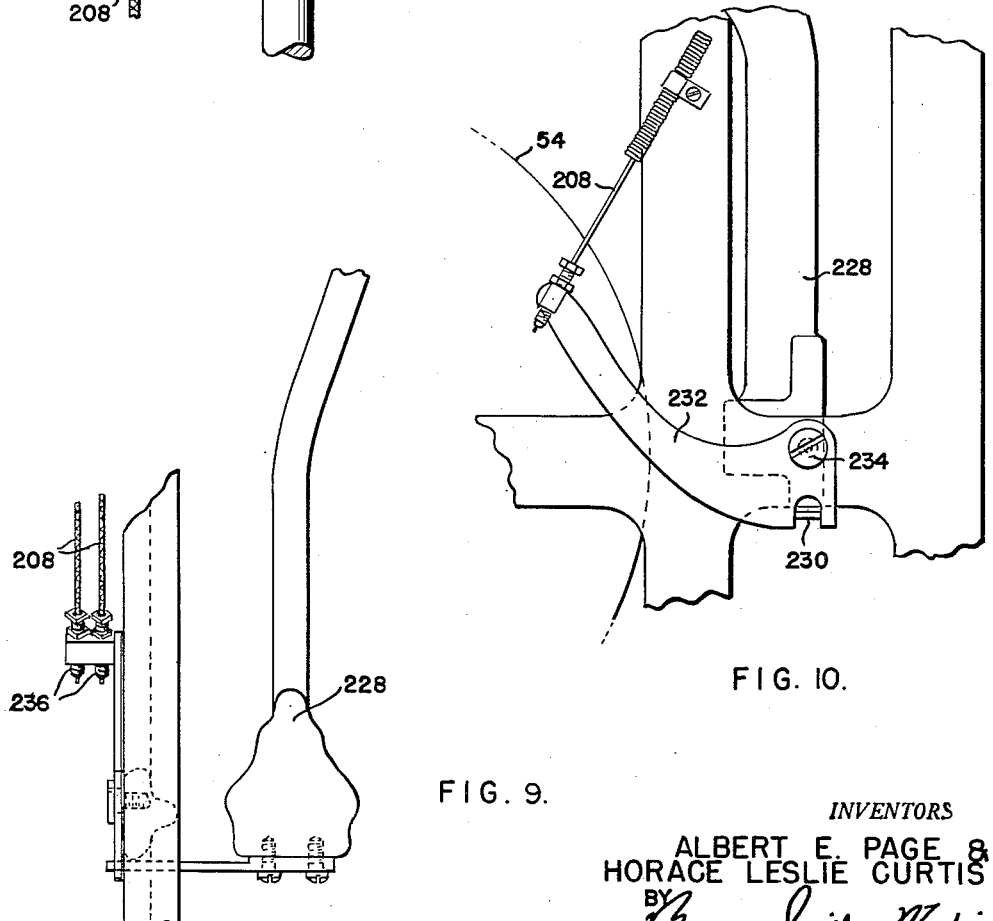
FIG. 9.
FIG. 10.
INVENTORS
ALBERT E. PAGE &
HORACE LESLIE CURTIS
ATTORNEYS

INVENTORS
ALBERT E. PAGE &
HORACE LESLIE CURTIS

United States Patent Office 2,963,887
Patented Dec. 13, 1960

2,963,887
STITCH LENGTH CONTROL MECHANISM FOR KNITTING MACHINE

Albert E. Page, West Palm Beach, Fla., and Horace Leslie Curtis, Gilford, N.H., assignors to Scott & Williams, Incorporated, Laconia, N.H., a corporation of Massachusetts Filed July 19, 1956, Ser. No. 598,791

11 Claims. (Cl. 66—54)

This invention relates to knitting machines and has particular reference to the automatic control of stitch size in multiple feed knitting machines, particularly those designed for the knitting of sheer ladies' hosiery.

Difficulties are experienced in the knitting of sheer ladies' hosiery, in particular, in that, due to variations in yarn and in the tension of yarn fed to the needles, stitches of varying length or size are produced. The variations in size of individual loops are minute, but due to the fact that a lady's stocking contains a very large number of courses, the minute variations of individual stitch lengths are cumulative to the end that successive stockings produced on the same machine and seemingly under identical conditions will vary greatly with the result that, after finishing, the stockings must be carefully sorted into pairs of approximately equal lengths. Furthermore, while the intention may be to produce stockings of particular lengths, there may be produced undesired numbers of stockings varying so far from the desired lengths that for a mill to fill an order an excessive number of stockings may have to be produced, the stockings of undesired lengths being then retained in hopes of filling an order requiring their lengths or being sold as irregulars.

Furthermore, the variations in stitch lengths may occur in such fashion that groups of courses having stitches of abnormal lengths may be interposed between groups of courses having stitches of normal lengths, and the result in such cases will be the appearance of horizontal shadows or streaks which may make the stockings unacceptable.

Further, stitches may vary in size sufficiently to produce abnormal reductions or increases in stocking circumference causing the stockings to be locally too tight or too loose when worn.

The variations indicated above as of objectionable type are not to be understood as those which are intentionally provided for the shaping of stockings. It is common practice to change stitch size in a smoothly continuous fashion in shaping ladies' circular knit hosiery from the calf portions into the ankle portions. Such variations are definitely programed by the controlling mechanism of the knitting machine. The objectionable variations here under discussion are those which normally occur beyond intentional control.

The foregoing remarks apply equally to single feed and multifeed knitting. In the case of multifeed knitting, however, there is the further possibility that the stitches drawn at the several feeds may be of different size. Under such conditions a "washboard" effect may be produced which is noticeable in the finished stocking. As will appear the present invention is particularly concerned with stitch control during multifeed knitting. The invention is applicable to hosiery machines which produce two feed knitting of the circular knit portions of the hosiery, and also double feed knitting of the reciprocatorily knit portions such as heels and toes. It will become evident that the invention is equally applicable where multifeed knitting occurs only during rotation, and is also applicable to machines involving the use of more than two feeds during knitting.

In the patent to Vernon Thomas Stack, No. 2,685,786, dated August 10, 1954, there is disclosed mechanism in a knitting machine for the automatic control of stitch lengths having as its object the prevention of shadow streaks or rings, the production of proper stocking diameters and the attainment of stockings of desired overall lengths. In accordance with the mechanism of said Stack patent, there is provided detection of variations of lengths of stitches shortly after the stitches have been formed, with provision for correction of stitch lengths so as to avoid the cumulative occurrence of abnormal stitches in large groups of successive courses which would lead to the objectionable results above discussed. In brief, in accordance with the said patent, the positions of sinkers are detected to give rise to signals indicative of variations of stitch lengths from normal, and the signals thus produced control through reversible electric motor means devices which change the relative positions of the stitch drawing needle cams and the ledges of sinkers over which the stitches are drawn. The mechanism so shown allows for the intentional variations of stitch length incidental to the usual fashioning or shaping procedure, but corrects deviations from the locally normal stitch lengths in such fashion that cumulative errors do not occur.

The present invention utilizes various of the principles disclosed in said Stack patent but involves particularly the control of stitches at more than one feed with proper interrelation of controls so as to maintain the desirable condition of having the stitches drawn at both feeds of the same size.

The detection of the size of stitches being produced may be effected in various ways but it has been found preferable to effect this detection as to stitches at each feed by the use of inward movements of sinkers following the completion of stitches at each feed as the sinkers bear against the stitches formed. In response to the varying sinker positions following the individual feeds, the stitch lengths formed at the respective feeds are controlled and this control may be effected in various ways:

In accordance with what will be specifically described, stitch cams at two feeds are individually adjusted vertically to change the relationships of the needles to sinker ledges in the drawing of stitches. However, stitch length control may be effected otherwise utilizing the present invention. For example, the control sensitive to the lengths of stitches formed at the main feed may control the height of the needle cylinder in the same fashion as disclosed in said Stack patent. This controls stitch length by change of the relative vertical relationship between the needles and the sinker ledges. It will be evident that in such case the stitches formed at the auxiliary feed will be simultaneously changed because the relationship of the needles to the sinker ledges will also be changed at that feed by reason of the needle cylinder adjustment. The mechanism hereafter described as associated with the auxiliary feed stitch cam may then be used to provide adjustments of stitch length at the auxiliary feed, correcting not only for undesired changes which might have been produced by virtue of the control originating at the main feed but also correcting for what might be independent variations of stitch lengths at the auxiliary feed.

The corrections of stitch lengths may, however, be made in still other fashions by the control of sinker cam positions to cause the drawing of stitches over different portions of sloping sinker ledges, by changing the timing of inward sinker movements, by varying tension on a grab take-up or on the fed yarns, or in other fashions. Reference may be made to the application of Robert H. Lawson, Serial No. 598,829, filed July 19, 1956, for discussions of such means and methods for control of stitch lengths. As will become apparent hereafter, the present invention involves the control of a pair of reversible motors for the independent control of stitch lengths at two feeds, and it will be apparent that such motors may be used for the fine adjustment of cam positions for control of either needle or sinker movements, or for the control of tensions and for various combinations of controls which might be different at the two feeds.

The general objects of the present invention have been indicated above. These and other objects particularly relating to various details of construction and operation will become apparent from the following description, read in conjunction with the accompanying drawings in which:

Figure 8 is a vertical section taken on the surface indicated at 8—8 in Figure 7;

Figures 9 and 10 are fragmentary elevations showing in particular stitch graduating controls of the sinker feeler cam assemblies;

Figure 1:
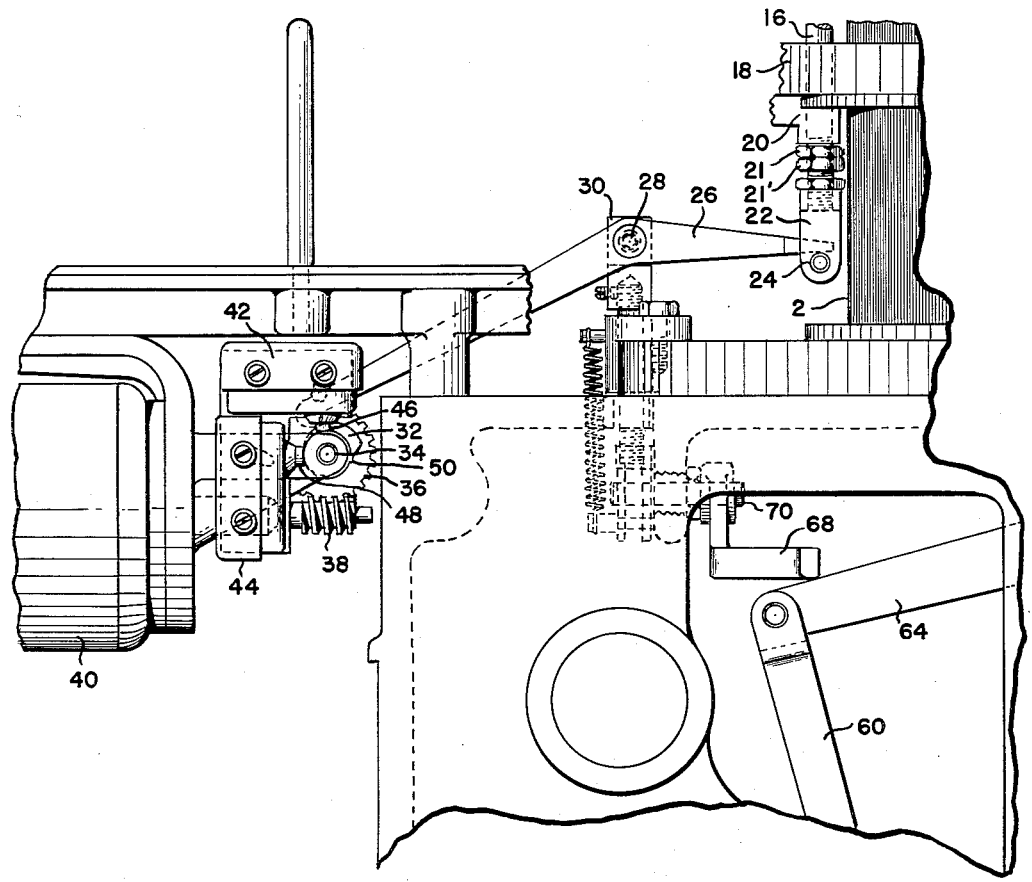
Figure 1 is a left-hand elevation of a main stitch cam operating mechanism.

Disclosed in detail herein are only such portions of a circular revolving cylinder independent latch needle knitting machine as are concerned directly with the present invention. The machine is otherwise conventional, and for more complete reference to the type of machine involved herein attention may be called to McDonough Patents 2,576, 962 and 2,664,723, respectively dated December 4, 1951, and January 5, 1954. The former of these patents particularly shows a knitting machine having two feeds which are used both for multifeed rotary knitting and for the multifeed reciprocatory knitting of heels and toes. The Stack patent referred to above also shows various details of the type of circular hosiery machine to which the invention is particularly applicable.

The machine specifically shown herein comprises the needle cylinder 2 which is conventionally driven for rotation and reciprocation and carries independent latch needles 4 with which are associated sinkers 6, the needles and sinkers being controlled by the usual cams of which there are shown herein only the main stitch cam 8 and its associated end cam 9 and the auxiliary stitch cam 10 which, in accordance with the present specific disclosure, are controlled for adjustment of stitch size. These adjustments are active only during rotary knitting but are consistent with the multifeed reciprocatory knitting of heels and toes in the usual fashion.

Figure 2:
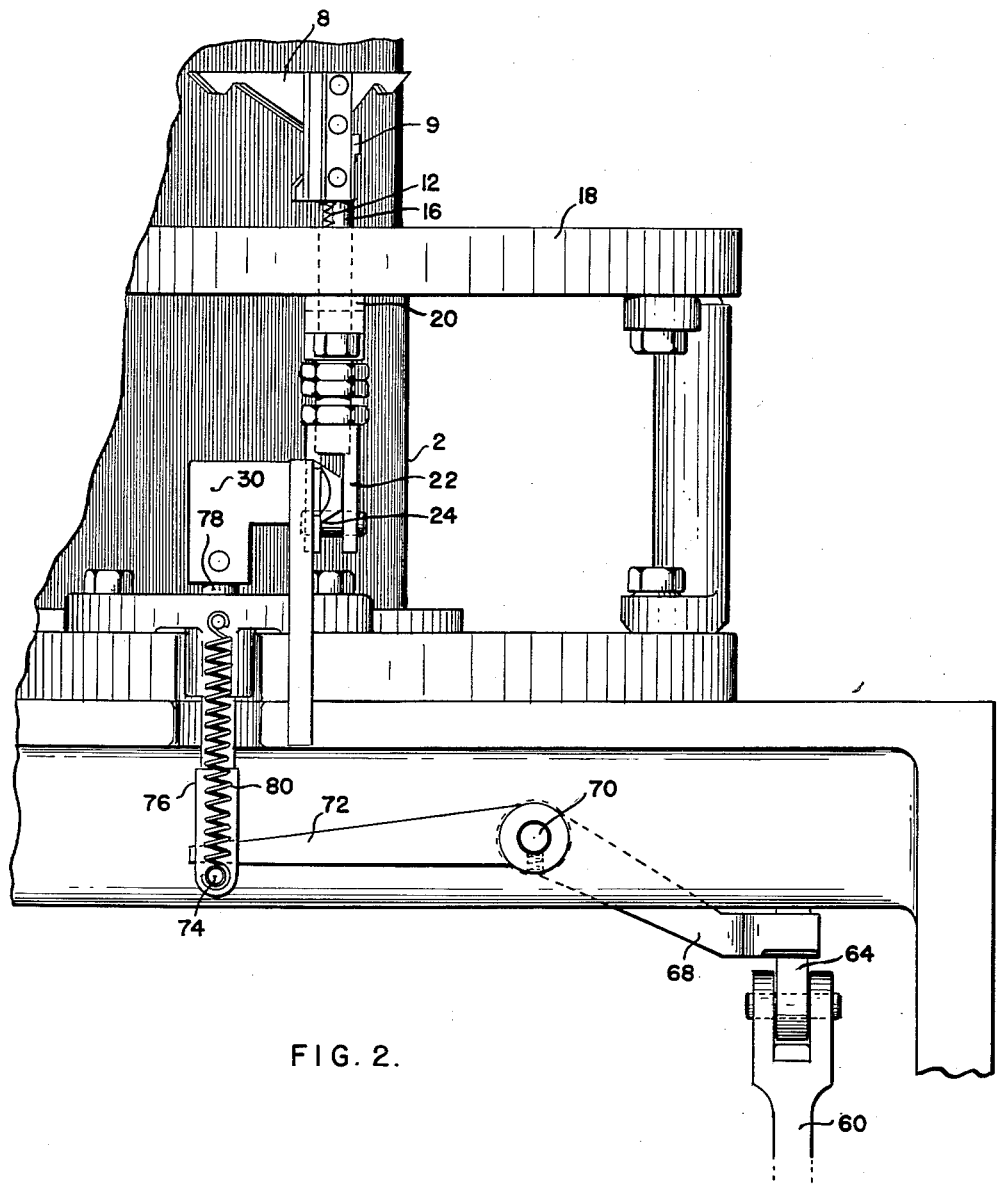
Figure 2 is a rear elevation of the same.
Figure 3:
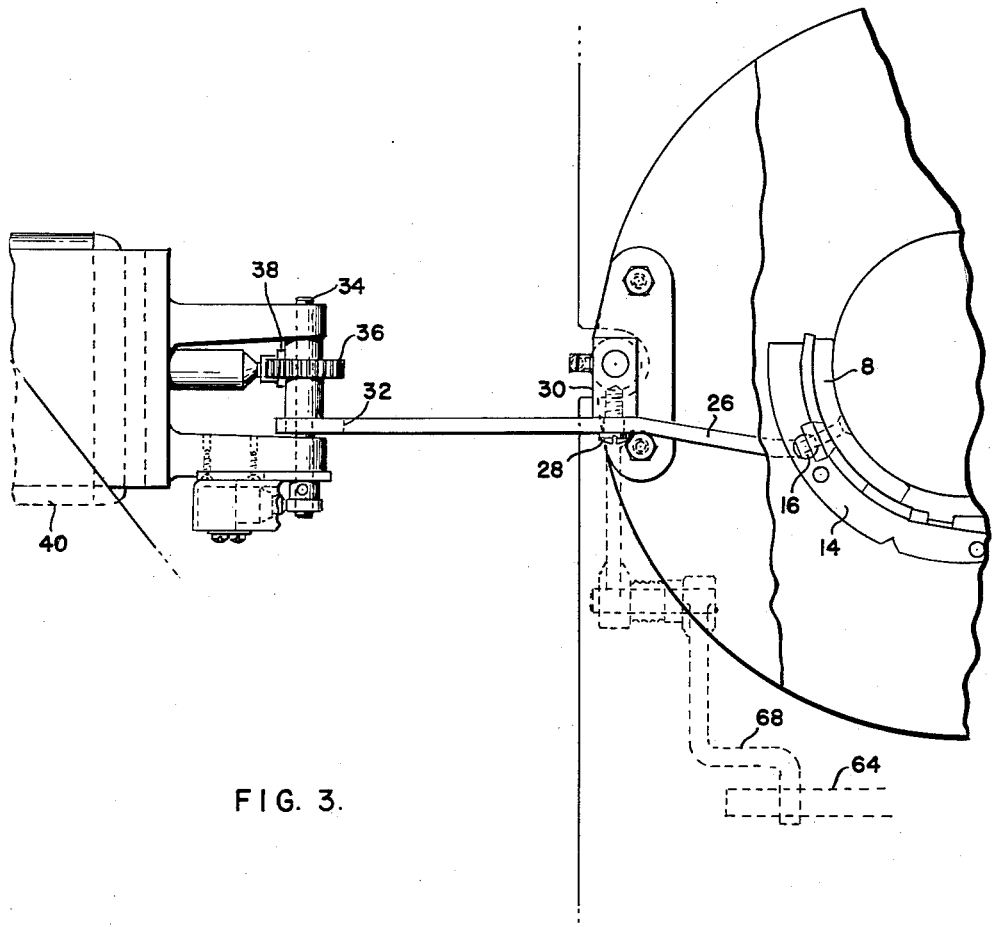
Figure 3 is a plan view of the same.

Reference may now be made particularly to Figures 1, 2 and 3 which show the devices for making adjusting movements of the cam 8. The assembly of this cam 8 with cam 9 is urged upwardly by a spring 12 (the position of which is diagrammed in Figure 2), the spring being housed in, and the cam assembly being guided in, a mounting bracket 14, there extending downwardly from the assembly of the two cams the rod 16 which passes through an opening in the bed plate 18 and which is guided by a bushing member 20 secured to the underside of that bed plate. A nut 21, associated with a lock nut 21', is threaded on the rod 16 to limit upward movement of this rod and the cams secured thereto under the action of the spring 12. The adjustment of the nut 21 thus determines by its abutment with the bushing 20 what may be considered the "normal" position of the cams 8 and 9 which they occupy during both rotary and reciprocatory knitting when the special controls provided in accordance with the present invention are rendered ineffective.

The lower end of the rod 16 carries the yoke 22 which supports the transverse pin 24 arranged to be engaged by one end of a lever 26 which is pivoted at 28 to a bracket 30. The oposite end of this lever is arranged to follow a cam 32 secured to a shaft 34 which carries a worm wheel 36 driven by a worm 38 on a shaft of a reversible electric motor 40. A pair of limit switches 42 and 44 are adjustably mounted so that their activating plungers 46 and 48 are engageable by a cam projection 50 of a cam member secured to the shaft 34. As will appear from the discussion of a wiring diagram hereafter, these switches 42 and 44 are normally closed but are arranged to be opened by the action of the cam projection 50 to limit rotation of the shaft 34 to approximately ¾ of a revolution, the switch 42 being opened to stop the motor when the shaft reaches an extreme counterclockwise position as viewed in Figure 1, while the switch 44 is arranged to stop the motor when an extreme clockwise limit of movement is attained.

A cam 52 carried by the main cam drum 54 of the machine (see Figure 4) is arranged to act upon a lever 56 which is pivoted to the frame at 58 and which is connected by a link 60, urged downwardly by a spring 62, to a lever 64 which is pivoted at 66. The function of the one or more cams 52 is to render the automatic controlling devices operative. As shown in Figures 1, 2 and 3, there overlies lever 64 an arm 68 secured to a shaft 70 mounted in the frame, this shaft also carrying an arm 72 which, when lever 64 is rocked by the action of cam 52, presses downwardly upon the pin 74 carried by a yoke 76 secured to a plunger 78 mounted for vertical movement and carrying the bracket member 30 which pivotally supports the lever 26, a spring 80 normally urging the bracket 30 upwardly. When there is no cam 52 acting on the follower 56, the bracket 30 is free to be moved upwardly by spring 80 and this raises the pivot 28 of lever 26 so that the stitch cam supporting rod 16 is free to move upwardly under the action of spring 12 to move cam 8 to its uppermost position determined by engagement of nut 21 with the bushing 20, the cam 32 under these conditions having insufficient height that even if its highest portion engages lever 26 the lever will not be pressed downwardly against the pin 24. Thus, in the absence of the cam 52, the control by motor 40 is ineffective on cam 8. On the other hand, when a cam 52 is active on follower 56, the connections which have been described cause a lowering of bracket 30 and pivot 28 so that the lever 26 is maintained in a position to produce vertical movements of the cam 8 under control of the cam 32, which, as shown in Figure 1, is shaped to provide during the range of rotation of shaft 34 a smooth rise or fall of the left-hand end of lever 26 and corresponding rise or fall of the cam 8.

Figure 4:
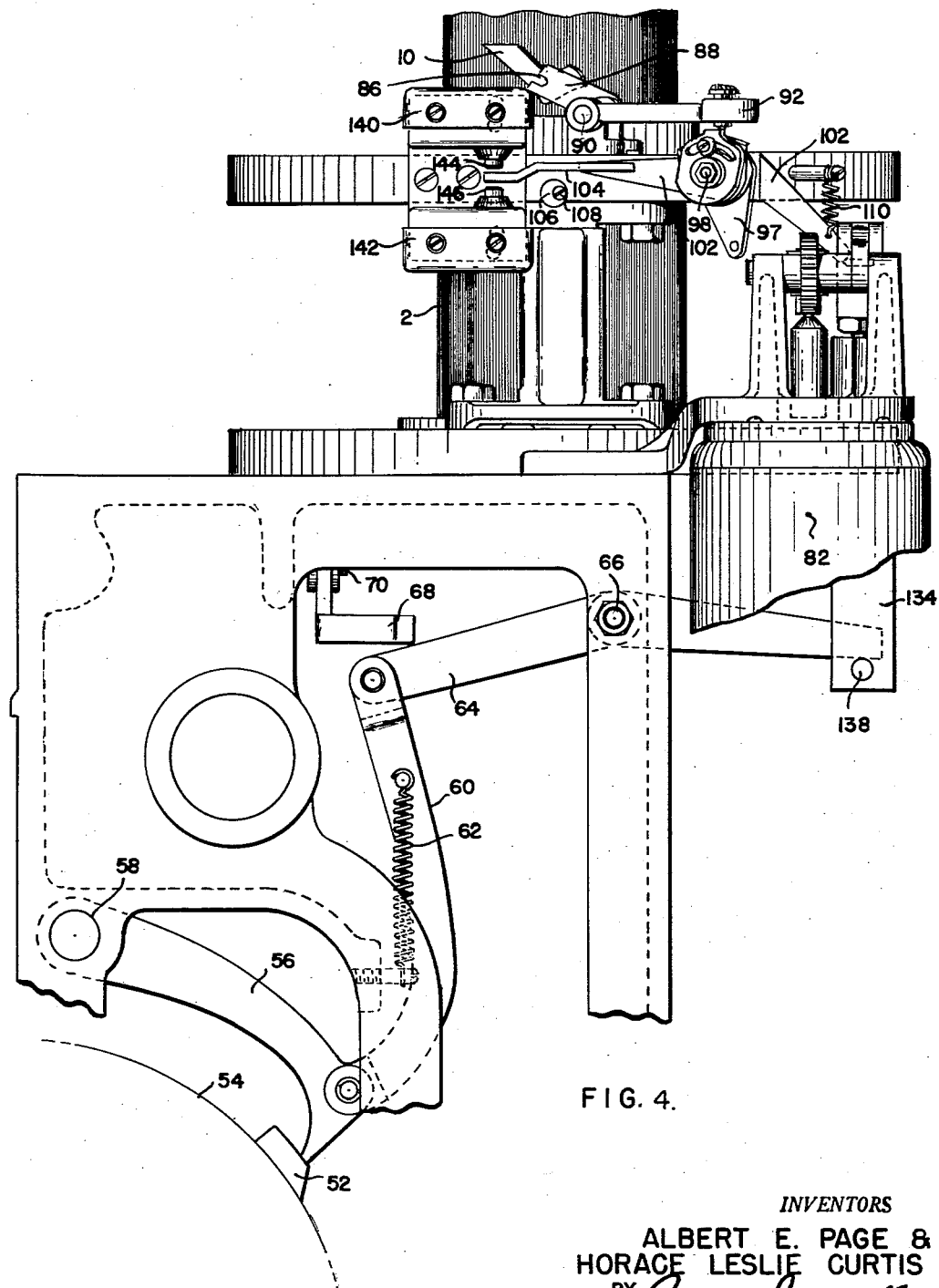
Figure 4 is a left-hand elevation of the auxiliary or second feed stitch cam operating mechanism.
Figure 5:
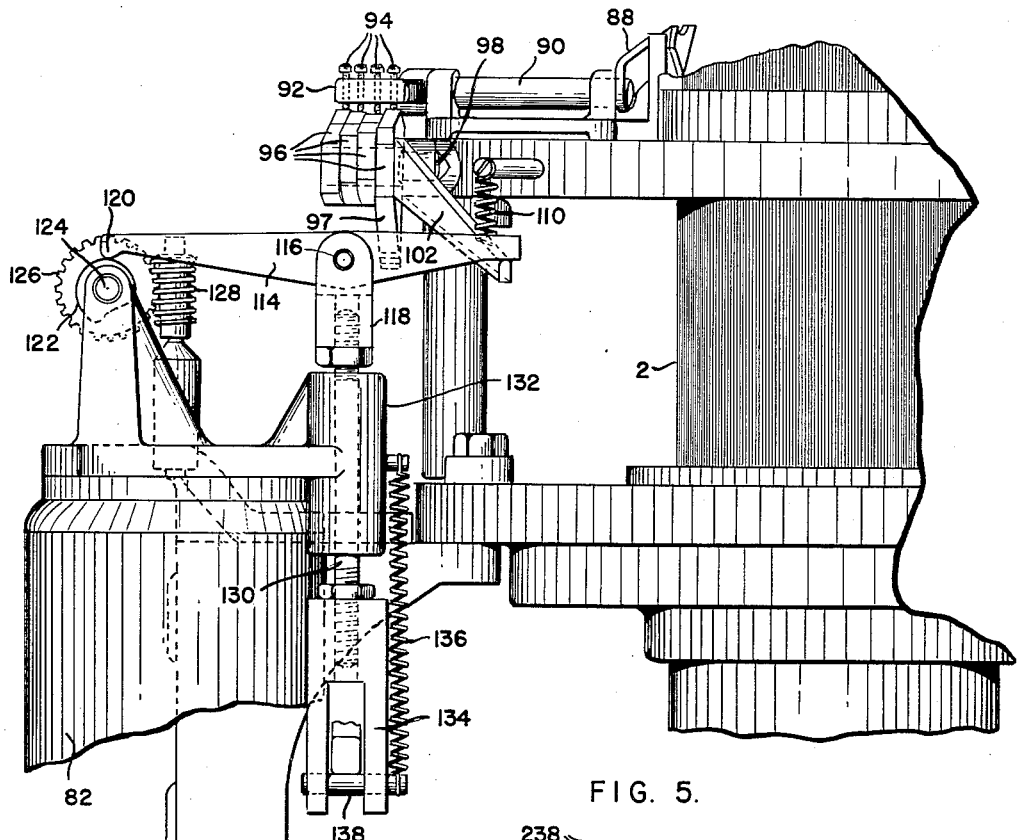
Figure 5 is a front view of the same.
Figure 6:
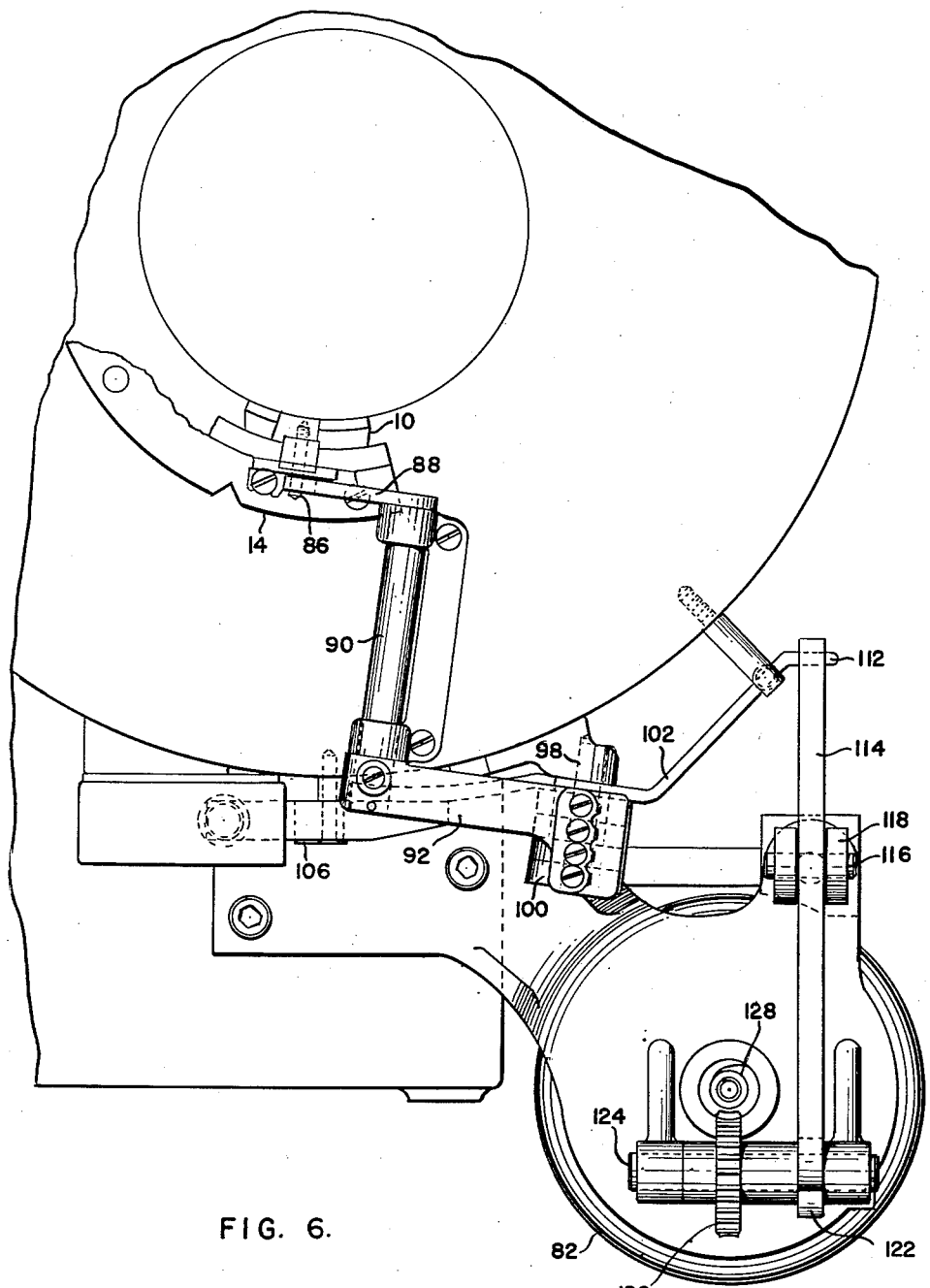
Figure 6 is a plan view of the same.
Figure 7:
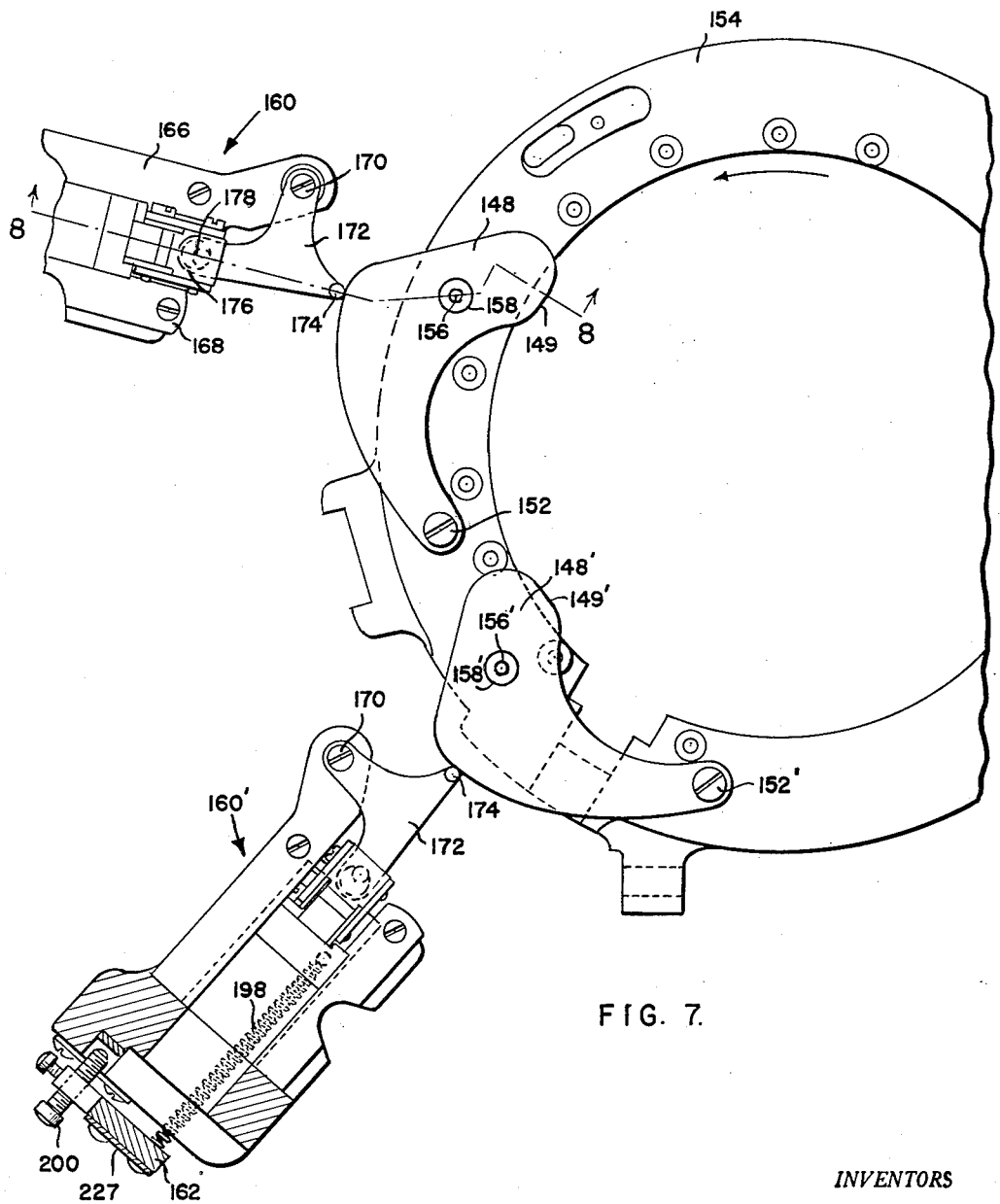
Figure 7 is a plan view showing feeler devices and switching mechanism associated therewith, certain portions of said figure being in section as taken on the surface indicated at 7—7 in Figure 8.

Referring now to Figures 4, 5 and 6, there is particularly shown therein the control of vertical position of the auxiliary stitch cam 10 under the action of a second reversible motor 82. The cam 10 is carried by a slide mounted conventionally for vertical movement in the bracket 14, there being provided in the bracket a spring (not shown) which normally urges the cam 10 to an uppermost position. (This uppermost position is determined indirectly by an eccentric 106 as hereafter referred to.)

The cam slide assembly is provided with an outwardly extending pin 86 which is embraced by the forked end of an arm 88 secured to a shaft 90 mounted in a fixed bracket, which shaft carries a second arm 92 at the end of which there are provided adjustable cam following screws 94, there being four of these screws shown. These screws are arranged to be individually acted upon by cams 96 which form a group relatively adjustable with respect to each other, one of these cams being provided with a depending arm 97. These cams are so arranged that in any one angular position of the assembly only one of the screws 94 is engaged by a cam. The arrangement just described is identical with that shown in McDonough Patent 2,664,723, referred to above, and the connections for control of the cams through the arm 97 are identical with what is disclosed in said patent and need not be detailed. It will suffice to state that on the main cam drum there are provided cams of four different heights for selectively determining which cam and screw combination 96, 94 is effective to control the lever 92 and hence the vertical position of the cam 10, an absence of any of said cams from active position permitting the cam 10 to rise to its uppermost position.

In said McDonough patent the assembly of cams 96 is pivoted directly on a fixed pin corresponding to the pin 98 shown herein. For purposes of the present invention, however, the cam assembly is not mounted directly on the pin 98 but rather the opening through the cam assembly is enlarged to embrace an eccentric 100 which is pivoted on the pin 98, there being secured to the eccentric the arm 102. The result is that as the eccentric is rotated the axis of pivotal mounting of the assembly of cams 96 is raised and lowered, the eccentric being positioned, as indicated in Figure 6, with its throw toward the left as viewed in that figure, so that as the lever 102 rocks clockwise, as viewed in Figure 4, the axis of mounting of the cams 96 is raised. For purposes described in the last mentioned McDonough patent, the axis about which the cams 96 move may be regarded as fixed; but adjustable movement of this axis is effected to carry out the purposes of the present invention.

The arm 102 has an extension indicated at 104 which limits its counterclockwise rotation as viewed in Figure 4 by engagement with the eccentric 106 which is secured to the frame at 108 in an adjusted position. With one of the screws 94 engaging one of the cams 96, the limit of counterclockwise movement of lever 102 thus provided limits the uppermost position of the cam 10. This is because the cam assembly 96 then has its lowermost position limited.

A spring 110 urges the lever 102 counterclockwise as viewed in Figure 4 to cause its end 112 to engage beneath an end of a lever 114 pivoted in a bracket 118 at 116. The end 120 of lever 114 is arranged to follow a small cam 122 secured to a shaft 124 to which is secured a worm wheel 126 driven by a worm 128 on the shaft of the motor 82.

The bracket 118 is carried by a plunger 130 guided for vertical movement in a bushing 132 and carrying at its lower end a yoke 134 carrying a transverse pin 138 engageable by the free end of the lever 64 previously described. A spring 136 urges the rod 130 and its associated parts upwardly. When a cam 52 is active on follower 56, the rod 130 is depressed against the action of spring 136 and so moves the pivot 116 of lever 114 so that its ends simultaneously engage the cam 122 and the lever 102.

Motor 82 then controls the positions of cam 10 by positioning the cam 122, one of the screws 94 engaging a cam 96 as determined by a cam on the main cam drum as described in said McDonough patent. The position of cam 10 depends upon the movement of the eccentric 100 under the motor control. However, the uppermost position is in any event limited by the action of the eccentric stop 106.

Limit switches 140 and 142 are adjustably mounted so that the positions of their actuating plungers 144 and 146 are in the desired locations with respect to the end 104 of lever 102. These switches, as will be brought out in connection with the wiring diagram, respectively limit the action of the motor 82 to move the level 102 in the respective directions.

Beyond the knocking over points at the main and auxiliary feeds respectively are feeler levers 148 and 148' the portions 149 and 149' of which engage the backs 150 of the sinkers 6 to follow the sinkers as they engage the formed stitches, the movements of the sinkers inwardly being then a measure of the lengths of the stitches formed. As will shortly appear, these levers 148 and 148' are subject to a fixed inward force imparting a definite stretch to the stitches through the sinkers, so that their positions accurately reflect the stitch lengths. The levers 148 and 148' are pivoted at 152 and 152', respectively, and their movements are limited by the location of fixed pins 156 and 156' in enlarged openings 158 and 158' in the levers.

The levers 148 and 148' are engaged by movable elements of switch assemblies indicated at 160 and 160' which are identical in construction so that the following description thereof applies to both, the same reference numerals being applied to both. It will be found that these assemblies are very similar, except for mechanical details, to corresponding assemblies shown in said Stack patent.

Each of the assemblies comprises a slide 162 mounted in a fixed bracket 164 within a milled slot in the latter, being retained therein by plate members 166 and 168. To the plate member 166 there is pivoted at 170 a lever 172 provided with a hardened pin 174 arranged to follow its respective lever 148 or 148'. Lever 172 is provided with an opening 176 which embraces loosely a pin 178 carried by a switch lever 180 pivoted at 182 to a bracket 184 carried by the slide 162. As will be evident from Figure 8 the mass of the lever 180 is primarily to the left of pivot 182 so that under the action of gravity there is exerted on the lever 172 a force thrusting it against its lever 148 or 148' and thus supplying an inward force to the sinkers. This force as will be evident is approximately constant. The lever 180 is provided with a switch blade 186 which may selectively engage an upper contact screw 188 or a lower contact screw 190 threaded into bushings in a block of insulating material 192 which is pivoted at 194 to the bracket 184. Electrical connections are made to the screws 188 and 190 as will be hereafter described. The lever 180 and contact blade 186 are grounded. A stop 196 limits counterclockwise movement of the block 192 which, however, is free to be moved clockwise in the event that the sinkers should move unduly outwardly beyond the condition involving contact of blade 186 with the upper screw 188. Since the block 192 can then yield upwardly, damage is prevented under these conditions. When the blade 186 engages the lower contact 190 there will be no further effort exerted through the pin 178 on the sinkers. However, this is immaterial since corrective action will then take place with the corresponding motor running to cause the sinkers to be restored outwardly by the formation of smaller stitches.

A spring 198 urges the slide 162 radially inwardly to a position in which an adjustable follower screw 200 carried thereby will engage the sloping portion 202 of a wedge 204 mounted for vertical sliding movement in bracket 164 and urged upwardly by a spring 206, the wedge being pulled downwardly by a Bowden wire 208.

Figure 11:
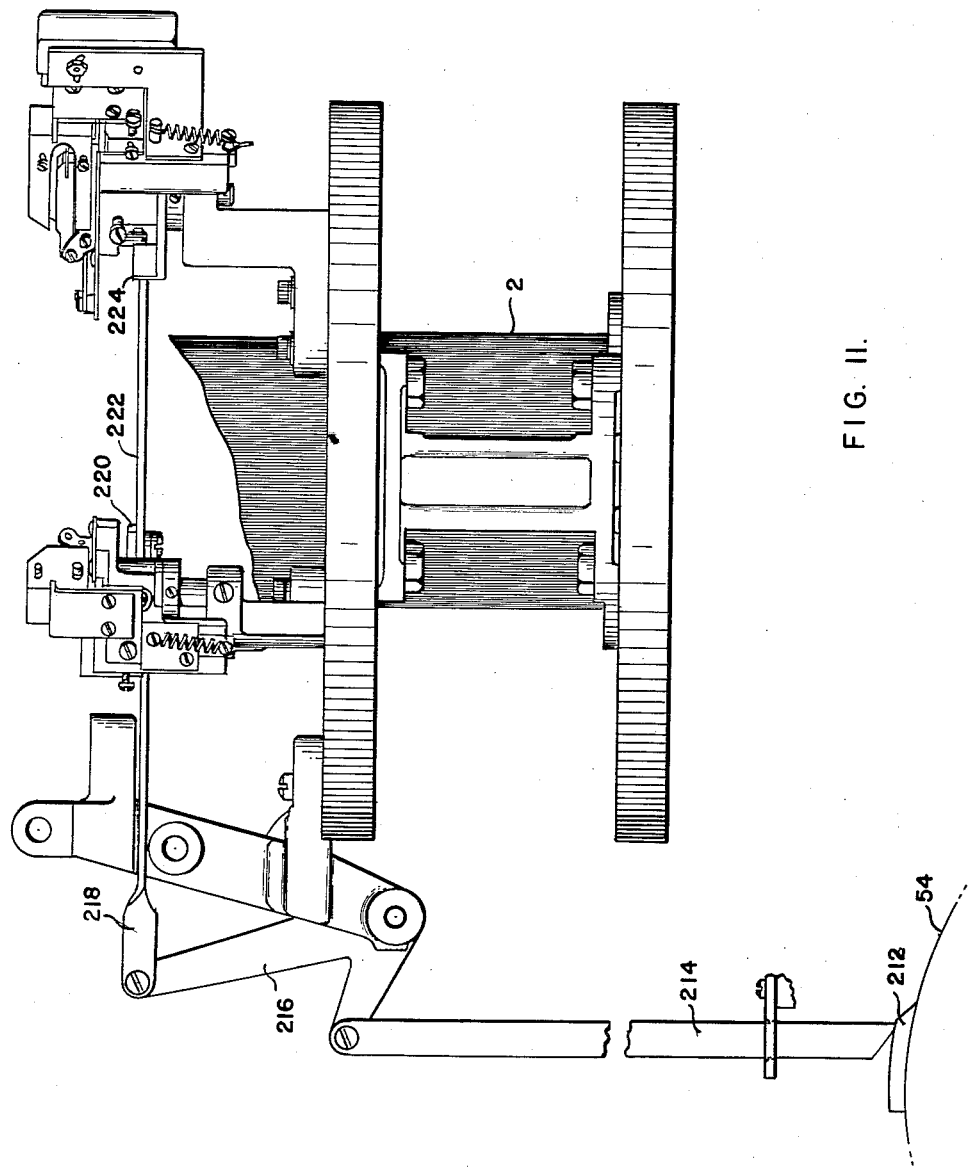
Figure 11 is a left-hand elevation showing the sinker feeler switch assemblies and the means for throwing them out of action during heel and toe knitting.
Figure 12:
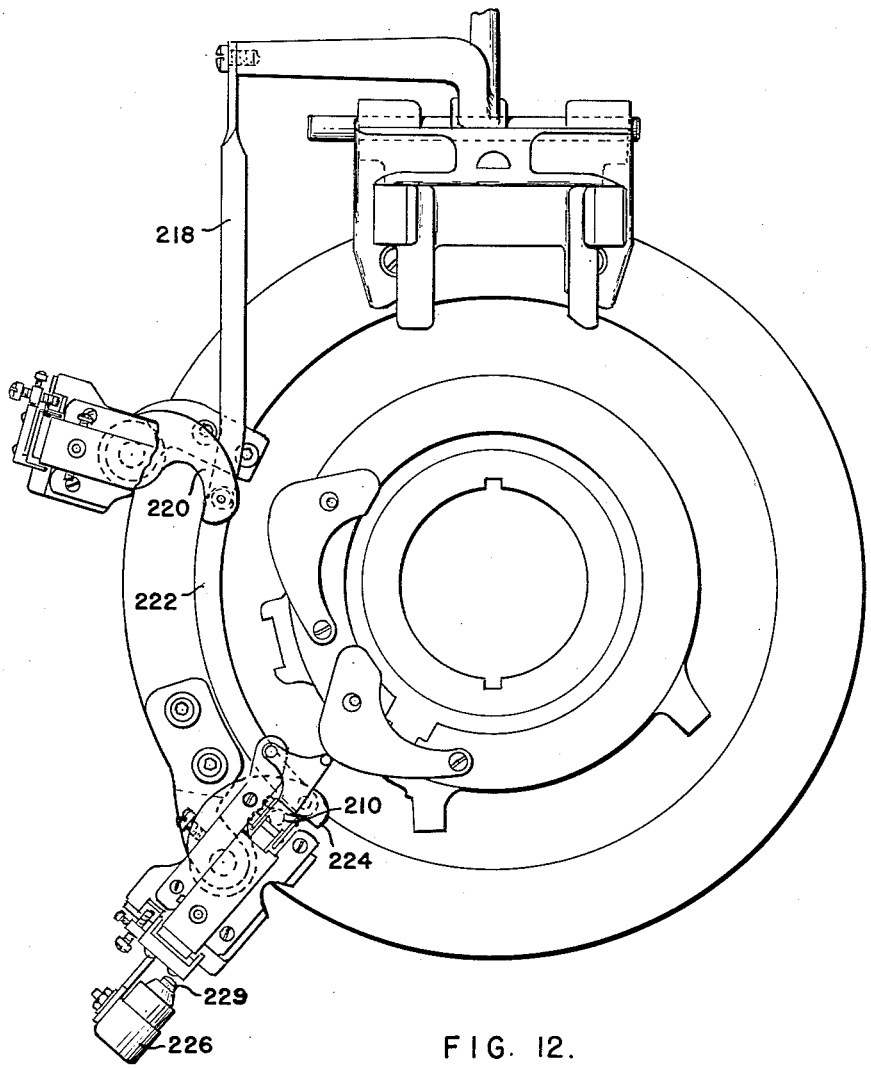
Figure 12 is a plan view showing the same devices as are shown in Figure 11.

The slide 162 is provided with a cam follower pin 210 which is acted upon to withdraw the slide during the formation of parts of a stocking, such as the heel and toe, in which the stitch control is not supposed to operate. The mechanism for accomplishing this is illustrated particularly in Figures 11 and 12. Cams 212 carried by the main cam drum 54 act upon a push rod 214 which is connected through bell crank 216 and link 218 to a cam 220 which in turn is connected through a link 222 to a cam 224. These cams 220 and 224 are arranged to engage the pins 210 of the respective switch assemblies to force their slides outwardly against the springs 198. Associated with one of the switch assemblies, the one associated with the auxiliary feed as illustrated in Figure 12, is a switch 226 having a plunger 229 which is engaged by a plate 227 upon outward movement of the corresponding slide 162 under the action of cam 224. The switch 226 is in the electrical circuit to de-energize it when the stitch control means is supposed to be inactive.

Referring to Figures 9 and 10, there is indicated at 228 the conventional lever which is acted upon by cams on the main cam drum and by a cam to produce fashioning in order to effect control of the level of the needle cylinder and therefore of the sinker ledges. This arrangement is conventional in machines not provided with the automatic control of the type herein described. The lower end of this lever 228 is provided with an extension 230 which engages within a fork in a lever 232 pivoted at 234 to the frame. This lever 232 has secured in adjustable screw elements 236 the Bowden wires 208 which control the wedges 204.

The purpose of the arrangement just mentioned is to limit the automatic control means to merely very slight adjustments of stitch length. When the lever 228 is moved to a definite position or to a varying position, as during fashioning, the connection through Bowden wires 208 serves to move the wedges 204 so that they will affect corresponding positioning of the slides 162 and all of the parts carried thereby to substantially the positions corresponding to the sinker positions which would correspond to the desired size stitches. Accordingly, in this arrangement specifically disclosed herein, the automatic control is never required to correct stitch lengths to an extent greater than a few thousandths of an inch movement.

It will be evident that the size stitch to be controlled depends upon the setting of the slide 162. If the slide 162 is moved inwardly, the lever 180 carrying the blade 186 will move clockwise, making electrical contact with screw 188. This will start the motor which controls the position of the corresponding stitch cam and cause the stitch cam to move downward. The needles will then draw a longer stitch. The longer stitch thus drawn will permit the sinkers to move inward until the lever 180 carrying blade 186 drops sufficiently to break the electrical contact with screw 188. The motor will then stop and a new equilibrium will have been established.

However, if it is desired, for example during fashioning, to have that solely under the control of the control mechanism herein discussed, the wedge 204 may be correspondingly positioned by the main fashioning cam without the usual control of height of the needle cylinder. Then as the wedge moves the stitch lengths will be correspondingly changed. In such case, however, the range of movement of the levers 148 and 148' and of levers 172 will be quite substantial. Likewise the movements imparted to the stitch cams will then be substantial. Generally it is more desirable to have control as specifically shown, utilizing movements of the needle cylinder vertically to effect major changes in stitch size and using the automatic control means only for final corrections. This is particularly desirable since it is then unnecessary to make adjustments of the throat plate or of cams acting on the needle butts except for the stitch cams and the usual end cams which normally move with the stitch cams as a unit. If the stitch cams were required to have considerable ranges of movement it might be necessary in certain cases to move other cams simultaneously therewith.

It will be evident that the wedges 204 must be precisely the same in shape and must also be adjusted so that their movements precisely correspond in order to maintain the same size stitches at both feeds throughout a complete range of operation.

Figure 13:
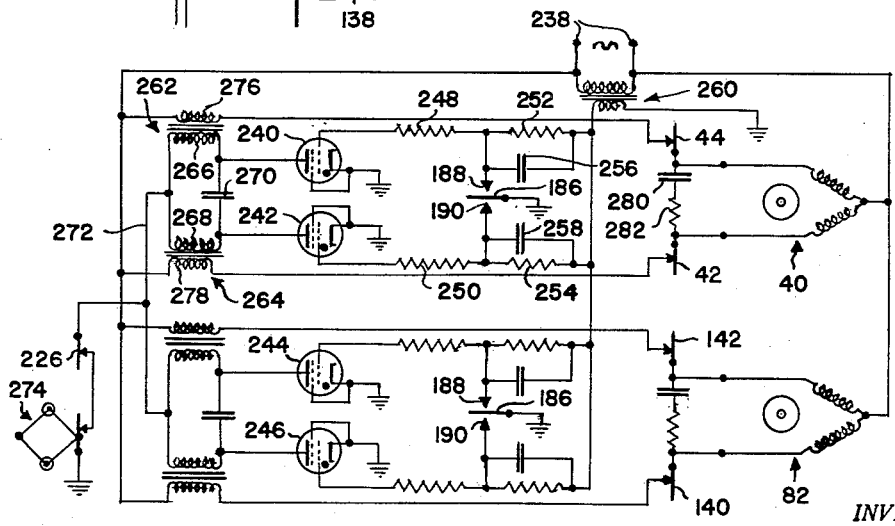
Figure 13 is a wiring diagram showing the electrical devices involved in the controls.

Reference may now be made to Figure 13 which shows the electrical connections involved and will make clear the overall operation.

Various elements of this circuit have already been described and are illustrated therein by the numerals previously used for them. The motors 40 and 82 are reversible induction motors which may be of low power rating in the arrangement described since they are called upon to do little mechanical work. However if the needle cylinder is to be raised or lowered by one of the motors as described above a motor having suitable power output should be used. The limit switches 42, 44, 140 and 142 have already been described. Reference has also been made to the switch 226 which is normally closed but is opened during such periods of a cycle of operation in which the automatic control is to be inactive. At 274 there is indicated a centrifigual switch which is of a type normally closed when the machine is running but which opens when the machine stops. This is to prevent operation of the controlling mechanism if the machine is stopped either as a part of normal operation or by a conventional stop motion.

Commercial alternating supply terminals are indicated at 238 and serve for the operation of all of the electrical elements. The terminals 238 may supply alternating current at any available frequency and at conventional power voltages such as 110 or 220 volts. It will be noted that the circuit in Figure 13 is symmetrical with respect to the motors 40 and 82 and there are indicated the two feeler contact arrangements comprising the contact blades 186 and their associated upper and lower contacts 188 and 190. To prevent sparking at the contacts and also to limit the exposed potentials, it is desirable to utilize for control gaseous thyratrons indicated at 240, 242 and 244 and 246 which may be of the 2050 type or of similar type. Such thyratrons have negative grid control characteristics and this leads to simplicity in making possible firing under conditions of grounded grid and grounded cathode. It will suffice to describe the circuitry associated with motor 40 since that associated with motor 82 is identical.

The control grids of the thyratrons 240 and 242 are respectively connected through current limiting resistors 248 and 250 to the respective contacts 188 and 190 which are selectively engageable for control by the grounded blade 186. The cathodes of the thyratrons are grounded and in the present use the suppressors may also be grounded. The contacts 188 and 190 are respectively connected through resistors 252 and 254 and their shunting capacitors 256 and 258 to one terminal of the secondary of a transformer 260 the other terminal of which is grounded. While the output potential of this secondary is not critical, in utilizing 110 volt 60 cycle supply it has been found convenient to have a secondary output of the order of 22 volts. Reactors 262 and 264 of conventional type having readily saturable cores are associated with the individual thyratrons 240 and 242. The saturating windings 266 and 268 are connected to the respective thyratron anodes at one terminal of each and at their other terminals they are connected together and in series with switches 226 and 274 to ground. A capacitor 270 bridges the thyratron anodes. The power windings 276 and 278 are respectively connected from one side of the supply terminals 238 through the respective limit switches 44 and 42 to the reversing fields of the motor 40, which are connected together and to the other terminal of the supply. To secure optimum phasing, a series arrangement of a capacitor 280 and a resistor 282 bridges the field terminals.

Connections are, of course, made to secure proper direction of motor rotation in association with the limit switches 44 and 42 which, it will be noted, individually control the two directions of rotation, each without affecting the direction of rotation which it does not limit. The thyratron control circuit is not, per se, a part of the invention, but only the arrangements involving the limit switches and reversing switches etc. which have to do with the control operation. Briefly, the electrical operation is as follows:

The secondary of transformer 260 is so connected that a negative potential with respect to ground is applied to the thyratron control grids when the anodes of the thyratrons are positive with respect to ground. These anode potentials are applied by reason of the transformer secondary characteristics of the reactors 262 and 264 due to the low non-operating current flowing from each of the primary or power windings and the motor field windings. Under these conditions when the blade 186 does not ground either of the contacts 188 and 190 the windings 276 and 278 have such high inductance that relatively little current flows through the motor fields and that which does flow through the fields produces opposite torques so that the motor remains stationary. Assuming, on the other hand, that the blade 186 engages the upper contact 188, the control grid of thyratron 240 is raised to ground potential, resistor 252 being of such high resistance that the secondary of transformer 260 is not substantially affected there being very low current flow through the contact 188 to ground. Under these conditions the thyratron 240 fires on each half cycle during which its anode is positive, and under such conditions the inductance of winding 276 is low with the result that an operating current will flow through the field of the motor associated therewith with resulting rotation of the motor in one direction, i.e. that which will affect a change in stitch length such as to break the contact between 186 and 188. The operations incident to engagement of 186 with 190 are the same and produce rotation of motor 40 in the opposite direction. Motor 82 is, of course, similarly controlled. As indicated above, the control is somewhat more elaborate due to advantageous phase shifts produced by capacitor 280 and resistor 282 and these are conventional and have no special part to play in the present invention.

From the foregoing description the overall operation will be evident. Considering what has been specifically disclosed, the stitch lengths at the two feeds are individually and separately controlled by movements of the respective stitch cams by the motors, and provisions are made to limit movements and to stop the automatic control operations during heel and toe production or during other events of the cycle as well as in the case of stoppage of the machine to prevent the control mechanism from going far out of adjustment so that when its operation is renewed, for example, following heel formation, there will be little delay in reaching a stable and controlled operating condition.

As indicated in the beginning of this specification, the control during two feed knitting need not necessarily be by the operation of stitch cams at the two feeds. The motors 40 and 82 which operate independently of each other may operate other means for controlling stitch length. For example, the motor 40 controlled from the main feed stitch detector may serve to raise and lower the needle cylinder as in said Stack patent. If that is the case the motor 82 may control the auxiliary feed stitch cam and will serve to adjust it to compensate not only for changes controlled from the main feed but also for improper lengths of stitches produced at the auxiliary feed. For example, assuming that the stitches produced at the auxiliary feed are of proper length, and that the detector at the main feed senses stitches which are too long, the latter would lower the needle cylinder, i.e. the sinker ledges, with respect to the main feed stitch cam, and this would produce too short stitches at the auxiliary feed. The auxiliary feed control motor 82 would then operate to correspondingly lower the auxiliary feed cam to maintain the auxiliary feed stitches at proper length. On the other hand, if the auxiliary feed stitches were of improper length, only the motor 82 would operate to effect a correction in operation.

It will also be evident that the motors 40 and 82 may control individually different or individually similar other stitch length affecting operations among which may be mentioned differences of sinker radial motions, premature or delayed sinker waves or needle waves, or one of the motors may operate to control fabric tension in the use of a grab take-up. It will be evident, therefore, that the invention is of quite general applicability to effect proper correlation between operations at two feeds. Furthermore, by adding a third or more controls, operations may be controlled at more than two feeds. It will be evident that the invention is also applicable whether or not multiple feed reciprocatory knitting is involved.

It may also be noted, as described in detail above, that fashioning may be effected independently of the controls or solely by them. It has been pointed out that it is advantageous to effect fashioning primarily by adjustment of needle cylinder height, simultaneously controlling the wedges 204 so that the automatic controlling means is used to produce only slight corrective movements of the stitch cams.

In view of the foregoing aspects of general applicability of the invention it will be evident that it is not to be regarded as limited except as required by the following claims.

What is claimed is:

1. Stitch control means for a circular independent needle knitting machine having needles and elements cooperating therewith for the formation of stitches at a plurality of feed points, comprising sensing means associated with each feed point sensing the size of stitches produced thereat, and means responsive to said sensing means for controlling relationships of the needles and elements cooperating therewith to control the size of stitches being formed at each of said feed points.

2. Stitch control means for a circular independent needle knitting machine having needles and elements cooperating therewith for the formation of stitches at a plurality of feed points, comprising sensing means associated with each feed point sensing the size of stitches produced thereat, and means individually and separately responsive to said sensing means for controlling relationships of the needles and elements cooperating therewith to control separately the size of stitches being formed at each of said feed points.

3. Stitch control means for a circular independent needle knitting machine having needles and elements cooperating therewith for the formation of stitches at a plurality of feed points, comprising sensing means associated with each feed point sensing the size of stitches produced thereat, means individually and separately responsive to said sensing means for controlling separately the size of stitches being formed at each of said feed points, and means for rendering the control by said controlling means ineffective at both feed points simultaneously and effective at both feed points simultaneously.

4. Stitch control means for a circular independent needle knitting machine having needles and elements cooperating therewith for the formation of stitches at a plurality of feed points, comprising sensing means associated with each feed point sensing the size of stitches produced thereat, means individually and separately responsive to said sensing means for controlling separately the size of stitches being formed at each of said feed points, said last named means including devices movable to determine the size of stitches to be produced at each of said feed points, and means for simultaneously controlling movements of said devices to maintain the formation of stitches of substantially the same size at both of said feed points.

5. Stitch control means for a circular independent needle knitting machine having needles and elements cooperating therewith for the formation of stitches at a plurality of feed points, comprising sensing means associated with each feed point sensing the size of stitches produced thereat, and means responsive to said sensing means for controlling the size of stitches being formed at each of said feed points, said controlling means including means for adjusting a stitch cam at at least one of said feed points.

6. Stitch control means for a circular independent needle knitting machine having needles and elements cooperating therewith for the formation of stitches at a plurality of feed points, comprising sensing means associated with each feed point sensing the size of stitches produced thereat, and means individually and separately responsive to said sensing means for controlling seperately the size of stitches being formed at each of said feed points, said controlling means including means for adjusting a stitch cam at at least one of said feed points.

7. Stitch control means for a circular independent needle knitting machine having needles and elements cooperating therewith for the formation of stitches at a plurality of feed points, comprising sensing means associated with each feed point sensing the size of stitches produced thereat, and means individually and separately responsive to said sensing means for controlling separately the size of stitches being formed at each of said feed points, said controlling means including means for adjusting a stitch cam at each of said feed points.

8. Stitch control means for a circular independent needle knitting machine having needles and elements cooperating therewith for the formation of stitches at a plurality of feed points, comprising sensing means associated with each feed point sensing the size of stitches produced thereat, means responsive to said sensing means for controlling the size of stitches being formed at each of said feed points, and means for rendering the control by said controlling means ineffective at both feed points simultaneously and effective at both feed points simultaneously.

9. Stitch control means according to claim 8 in which the controlling means is electrically operated and in which deenergization of the controlling means is effected when the control by said controlling means is rendered ineffective.

10. Stitch control means for a circular independent needle knitting machine having needles and elements cooperating therewith for the formation of stitches at a plurality of feed points, comprising sensing means associated with each feed point sensing the size of stitches produced thereat, and means responsive to said sensing means for controlling the size of stitches being formed at each of said feed points, said controlling means including means for adjusting the relationship of needles to elements cooperating therewith at at least one of said feed points.

11. Stitch control means for a circular independent needle knitting machine having needles and elements cooperating therewith for the formation of stitches at a plurality of feed points, comprising sensing means associated with each feed point sensing the size of stitches produced thereat, and means individually and separately responsive to said sensing means for controlling separately the size of stitches being formed at each of said feed points, said controlling means including means for adjusting the relationship of needles to elements cooperating therewith at each of said feed points.

References Cited in the file of this patent
UNITED STATES PATENTS

| | | |
|---|---|---|
| 2,516,535 | Stack | July 25, 1950 |
| 2,664,723 | McDonough | Jan. 5, 1954 |